United States Patent
Vaughn, Jr.

(10) Patent No.: US 8,973,981 B2
(45) Date of Patent: Mar. 10, 2015

(54) ACOUSTIC WHEEL WELL LINER

(71) Applicant: Techstyles, Inc., Bingham Farms, MI (US)

(72) Inventor: William H. Vaughn, Jr., Northville, MI (US)

(73) Assignee: Techstyles, Inc., Bingham Farms, MI (US)

( * ) Notice: Subject to any disclaimer, the term of this patent is extended or adjusted under 35 U.S.C. 154(b) by 0 days.

(21) Appl. No.: 13/688,253

(22) Filed: Nov. 29, 2012

(65) Prior Publication Data

US 2014/0159414 A1    Jun. 12, 2014

(51) Int. Cl.
*B60R 13/08*    (2006.01)

(52) U.S. Cl.
CPC .................................. *B60R 13/0861* (2013.01)
USPC ......................................... 296/198; 296/39.3

(58) Field of Classification Search
CPC ...... B62D 25/161; B62D 25/18; B62D 25/16; B62D 25/163; B62D 25/188; B60R 13/0861; B60R 13/083; B60R 13/0815; B32B 3/30; B32B 5/26; B32B 2307/102; B60C 19/002; B60N 3/048; F16F 15/023; F16F 7/01
USPC .......... 296/198, 193.11, 39.1, 37.1, 197, 100; 280/847, 857, 848, 152.5, 154, 851; 181/293, 290, 284, 292
See application file for complete search history.

(56) References Cited

U.S. PATENT DOCUMENTS

| | | | |
|---|---|---|---|
| 1,704,048 A * | 3/1929 | Jordan | 280/847 |
| 2,542,428 A * | 2/1951 | Peik | 181/290 |
| 4,735,427 A | 4/1988 | Fuchs | |
| 5,280,960 A | 1/1994 | Casey | |
| 5,493,081 A | 2/1996 | Manigold | |
| 5,839,761 A | 11/1998 | Dodt | |
| 5,851,626 A | 12/1998 | McCorry et al. | |
| 6,086,104 A | 7/2000 | Marchisio et al. | |
| 6,155,624 A | 12/2000 | Bienenstein, Jr. | |
| 6,799,782 B2 * | 10/2004 | Jain et al. | 280/848 |
| 6,953,205 B2 | 10/2005 | Friest et al. | |
| 7,011,181 B2 | 3/2006 | Albin, Jr. | |
| 7,182,172 B2 | 2/2007 | Albin, Jr. | |
| 7,419,188 B2 * | 9/2008 | Nicolai et al. | 280/847 |
| 7,448,468 B2 | 11/2008 | Czerny et al. | |
| 7,497,509 B2 * | 3/2009 | Omiya et al. | 296/198 |
| 7,810,828 B2 | 10/2010 | Sugiyama et al. | |
| 8,146,987 B2 | 4/2012 | Uchino | |
| 8,230,969 B2 | 7/2012 | Frederick et al. | |
| 2005/0006173 A1* | 1/2005 | Albin | 181/290 |
| 2006/0124387 A1* | 6/2006 | Berbner et al. | 181/290 |
| 2010/0078927 A1* | 4/2010 | Takeuchi | 280/851 |
| 2011/0284319 A1* | 11/2011 | Frederick et al. | 181/293 |

* cited by examiner

*Primary Examiner* — Glenn Dayoan
*Assistant Examiner* — Sunsurraye Westbrook
(74) *Attorney, Agent, or Firm* — Dickinson Wright PLLC (57) ABSTRACT

A wheel well liner for use in the wheel well of motor vehicles has an inner surface defining one or more acoustical sections. Each acoustical section includes a pattern of irregular or convoluted portions configured and arranged to absorb/attenuation sound. A layer of flock material is deposited on the inner surface of the wheel well liner to enhance aesthetics and provide supplemental sound attenuation.

27 Claims, 6 Drawing Sheets

ACOUSTIC WHEEL WELL LINER

FIELD

The present disclosure relates to wheel well liners for motor vehicles and, more particularly, to acoustic wheel well liners configured to absorb sound and vibration.

BACKGROUND

This section provides background information related to the present disclosure which is not necessarily prior art.

Many motor vehicles are now equipped with a liner inside each of the wheel well, commonly referred to as wheel well liners, and which function to limit ingress of moisture and debris into the vehicle. Most wheel well liners are injection molded of a polymeric material and typically include fasteners for securing the liner within the wheel well of the vehicle. An exemplary construction for such a wheel well liner is disclosed in U.S. Pat. No. 6,155,624 to Bienenstein.

Wheel well liners must be a relatively rigid component to maintain structural integrity and withstand the impact of debris thrown by the wheels of the vehicle. In addition, it is desirable that such wheel well liners attenuate road noise and the sound of debris impacting the rigid structure. Examples of wheel well liners having sound attenuating features are disclosed in the U.S. Pat. No. 4,735,427 to Fuchs and U.S. Publication No. US2008/0231082.

In view of increased consumer demand for vehicles with improved sound attenuation, a need exists to develop wheel well liners with enhance acoustical properties.

SUMMARY

This section provides a general summary of the disclosure, and is not a comprehensive disclosure of its full scope or all of its features and advantages.

In accordance with one aspect of the present disclosure, an acoustic wheel well liner for use in the wheel well of a motor vehicle is disclosed. The acoustic wheel well liner is fabricated from a polymeric material and includes an inner surface defining one or more distinct acoustical sections configured and arranged to provide optimized sound attenuation properties.

In accordance with a related aspect of the present disclosure, the acoustic wheel well liner includes a layer of flocking material applied to the inner surface for enhancing the appearance and provide additional sound attenuation.

Further areas of applicability will become apparent from the description provided herein. The description and specific examples in this summary are intended for purposes of illustration only and are not intended to limit the scope of the present disclosure. Additional benefits and advantages of the present disclosure will become apparent to those skilled in the art to which this invention relates from reading the following detailed description and the appended claims, taken in conjunction with the accompanying drawings.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The exemplary embodiments are provided so that this disclosure will be thorough and fully convey the scope of the present teachings to those who are skilled in the art. In particular, numerous specific details are set forth such as examples of specific components, devices, and methods to provide a thorough understanding of embodiments of the present disclosure. However, it will be apparent to those skilled in the art that some specific details need not be employed, that some of the exemplary embodiments may be embodied in different forms, and that neither should be construed to limit the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

In general, the present disclosure is directed to wheel well liners adapted for installation in the wheel housing or wheel well of a motor vehicle. More specifically, the wheel well liner of the present disclosure is configured and arranged to include an inner surface having one or more acoustical sections with a convoluted sound attenuating surface profile. The profiles of the convoluted sound attenuating surface(s) are formed during fabrication of the wheel well liner and preferably via an injection molding process, a back forming process, or a compression sheet forming process utilizing a polymeric material. The polymeric material is selected to withstand the environmental conditions experienced within the wheel well of the motor vehicle. Specifically, the polymeric material is selected to withstand the impact of debris while inhibiting the ingress of moisture, mud and debris into other portions of the motor vehicle. Portions of the inner surface of the liners, particularly the acoustical sections, may be flocked to deposit small fiber (i.e., textile) particles thereon in effort to provide enhanced sound attenuation and/or damping while also providing improved aesthetics.

Figure 1:
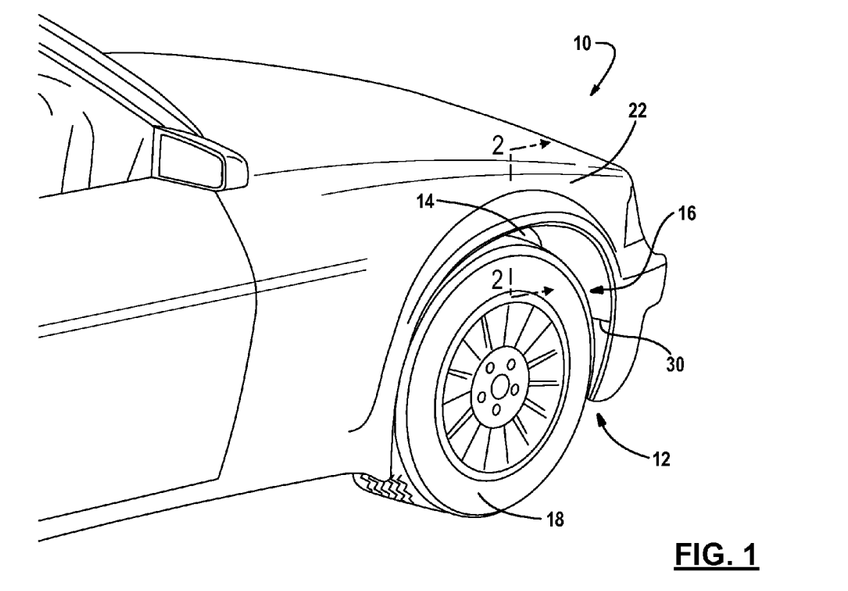
FIG. 1 is a perspective view of a portion of a motor vehicle equipped with a wheel well liner constructed in accordance with the teachings of the present disclosure.

With initial reference to FIG. 1 of the drawings, a portion of a motor vehicle 10 is shown. Motor vehicle 10 is generally shown as a passenger-type automobile. However, those skilled in the art will appreciate that motor vehicle 10 can be any other type of vehicle known in the art. A front passenger-side portion 12 of vehicle 10 is shown and which defines a right front wheel well 14 within which a wheel well liner 16 constructed in accordance with the present teachings is installed. A wheel 18 is disposed in wheel well 14. Liner 16 is configured and arranged to inhibit moisture and debris from being thrown off of wheel 18 into other internal portions of vehicle 10. As will be detailed, liner 16 is installed between a wheel well housing 20 and an exterior fender panel 22 which together define and delineate wheel well 14.

Figure 2:
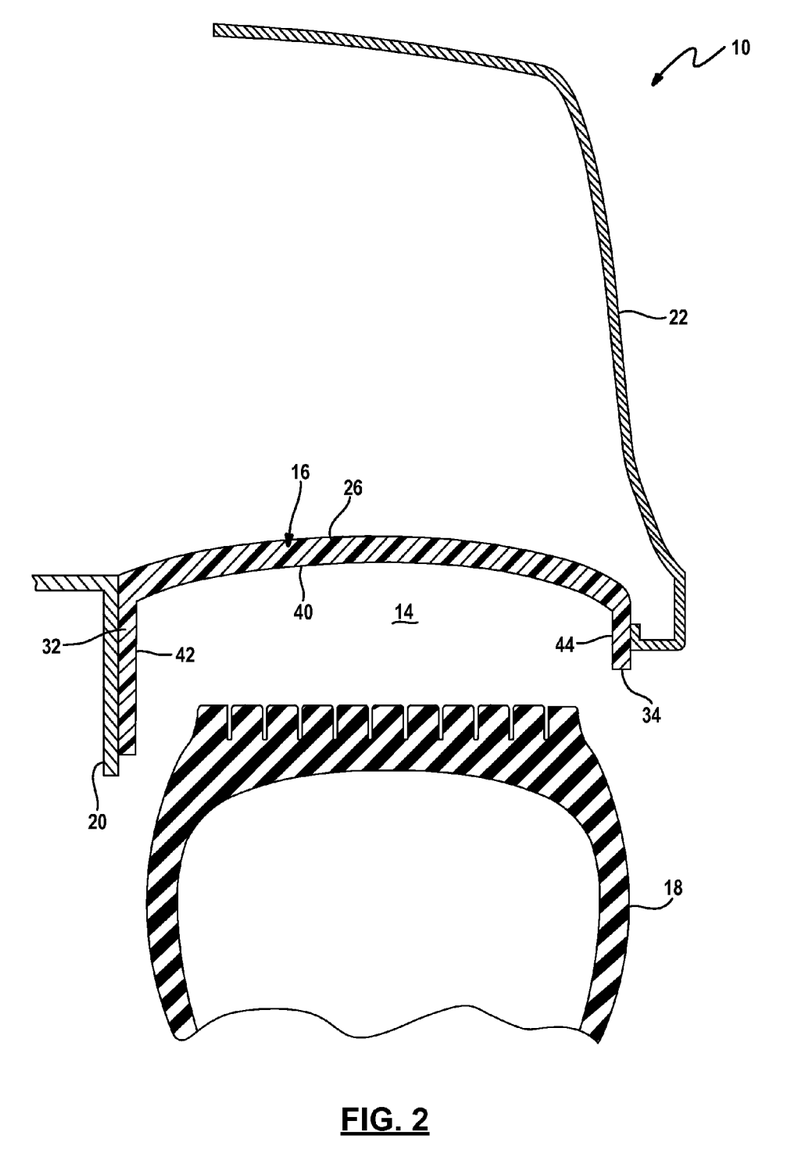
FIG. 2 is a sectional view of the motor vehicle shown in FIG. 1, taken generally along line 2-2 thereof.
Figure 3:
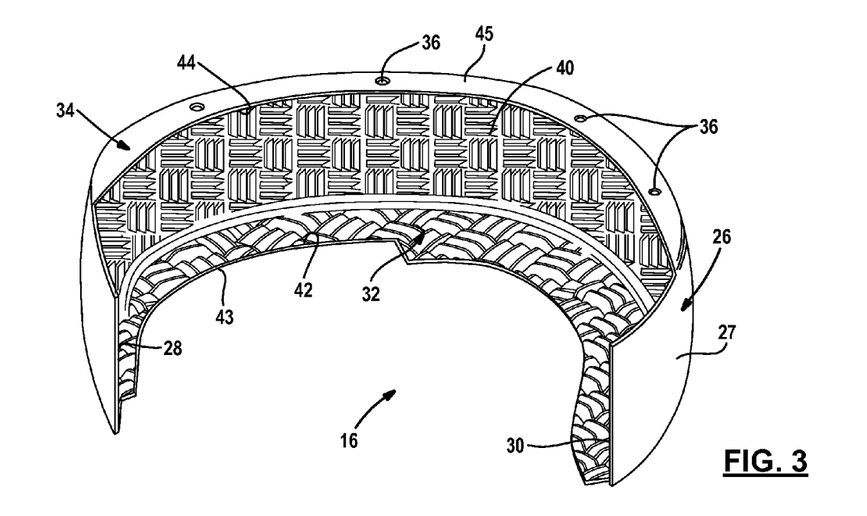
FIG. 3 is a perspective view of the wheel well liner showing a plurality of acoustical sections formed on its inner surface(s) in accordance with the present disclosure.

Liner 16 is shown prior to assembly into wheel well 14 of vehicle in FIG. 3 and in a partial sectional view in FIG. 2. Liner 16 may include a main body portion 26 terminating at end sections 28 and 30, and a pair of longitudinal inner and outer side flange portions 32 and 34 extending from main body portion 26 at least partially toward end sections 28 and 30. Liner 16 has an overall generally arcuate shape that is configured for attachment within wheel well 14. In particular, outer side flange 34 is adapted to engage and be secured to fender panel 22 while inner side flange 32 is adapted to engage and be secured to wheel housing 20. While the curvature of wheel well 14 is not constant, its arcuate shape generally conforms to a half-circle and facilitates installation of liner 16 radially outward from wheel 18.

Liner 16 is generally fabricated from a polymeric material. Polymers such as polypropylene or high-density polyethylene may be used for liner 16. However, those skilled in the art appreciate that other impact resistant materials can be used to fabricate line 16. Liner 16 may be injection molded to define a closed cell impermeable structure that provides the requisite rigidity and impact resistance and yet provides sufficient flexibility to permit installation of liner 16 into wheel well 14. As an alternative, liner 16 may be fabricated from a sheet of material surfaces, for example, via a compression sheet molding process. Liner 16 may include a plurality of mounting apertures 36 extending through one or more of radially extending side flange portions 32, 34 for securing liner 16 within wheel well 14 using suitable fasteners. Alternatively, it will be understood that apertures 36 may be eliminated in favor of attachment of liner 16 within wheel well 14 using other fastening techniques including, for example, self-tapping screws, push pins and/or rivets. Furthermore, fasteners may be integrally molded, or secured during the molding process, to one of the liner's 16 surfaces, thereby defining a wheel well liner with fasteners extending therefrom.

Figure 4:
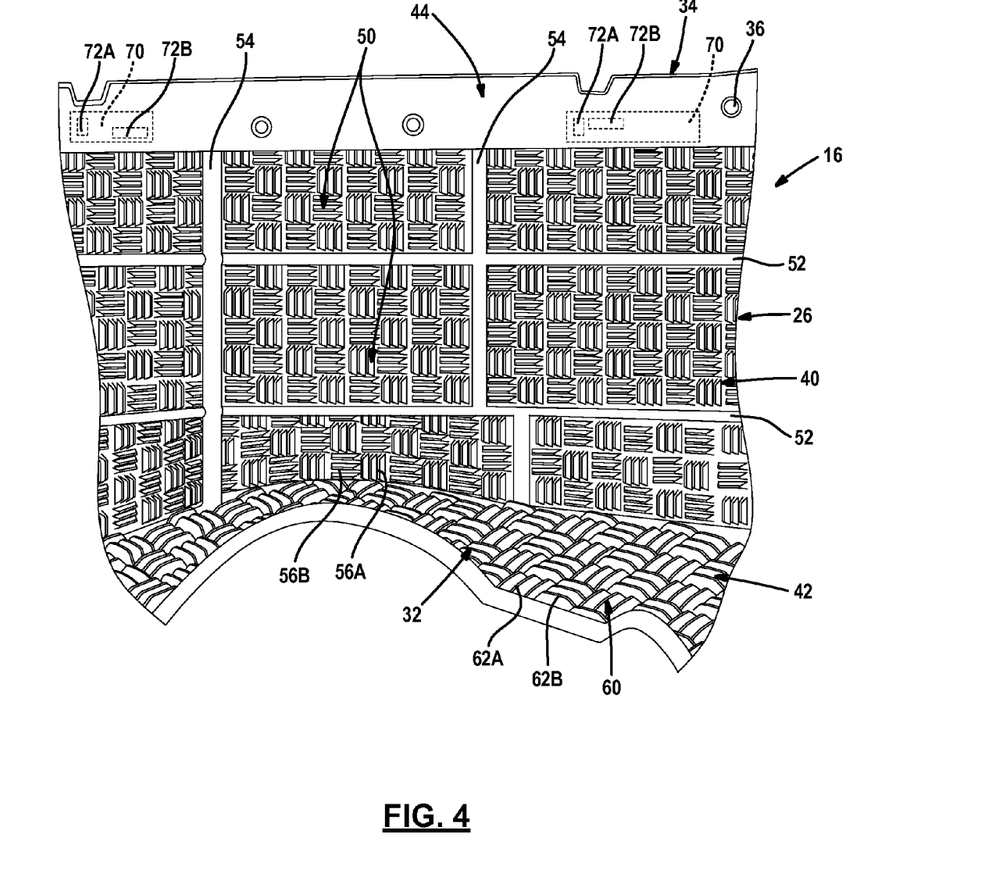
FIG. 4 is an enlarged partial view of FIG. 3 showing the convoluted surface profile of the acoustical sections in greater detail.

In accordance with one aspect of the present teachings, liner 16 may include an inner surface that is formed to include one or more acoustical sections have a surface profile defined by an irregular, hereinafter referred to as a "convoluted" sound attenuating surface. To this end, liner 16 is shown to include an inner wall surface 40 associated with main body portion 26, an inner wall surface 42 associated with inner side flange portion 32, and an inner wall surface 44 associated with outer side flange portion 34. With particular reference to FIGS. 2-4, main body portion 26 is shown to include a plurality of acoustical sections 50 that are configured in a "grid" pattern delineated by longitudinal boundaries 52 and lateral boundaries 54 to define generally rectangular acoustical sections 50. Each acoustical section 50 includes a profile comprised of a repetitive sequence of irregular surface portions 56A and 56B that are oriented in phased rows and columns to define the convoluted acoustical surfaces in association with inner wall surface 40 of main body portion 26.

As noted, these convoluted noise attenuating surfaces, associated with each acoustical section 50, are formed during the molding process of liner 16. While a continuous arrangement of acoustical sections 50 are shown in association with inner surface 40 of main body portion 26 of liner 16, it will be understood that inner wall surface 40 can also include a combination of non-convoluted (i.e., planar) surfaces interposed between adjacent convoluted surfaces if it is determined that such an arrangement provides enhanced acoustical and/or structural characteristics in a particular vehicular application.

Inner wall surface 42 of inner side flange portion 32 is also shown to include one or more acoustical sections 60. In this particular example, acoustical section 60 is continuous (i.e., not bounded in a grid pattern) and includes a profile comprised of a repetitive sequence of irregular portions 62A and 62B that are oriented in phased rows and columns to define the convoluted acoustical surfaces on inner wall surface 42 of inner side flange portion 32. Acoustical section(s) 60 can also be identical to acoustical sections 50 formed on main body portion 26 or, in the alternative, may be configured in a different pattern, phase, or number of irregular portions if desired to provide the required acoustical and structural characteristics.

Inner wall surface 44 of outer side flange portion 34 is shown to be planar and not include any type of acoustical sections having a convoluted inner surface profile. However, inner surface 44 may include a plurality of acoustical sections 70, which are shown schematically in phantom lines. Acoustical sections 70 can include a profile comprised of a repetitive sequence of irregular portions 72A and 72B that are oriented in phased rows and columns to define the convoluted acoustical surfaces on inner wall surface 44 of outer side flange portion 34. Acoustical sections 70 can be identical to either of acoustical sections 50 and 60 or, in the alternative, may be configured in a different pattern, phase, number of irregular portions and the like if desired to provide the required acoustical characteristics.

With reference again to FIG. 3, an outer surface 27 of main body section 26 and an outer surface 45 of outer flange portion 34 are shown to be planar. In this configuration, an outer surface 43 of inner flange portion 32 would also be planar. However, those skilled in the art will appreciate that liner 16 can be molded to have a relatively constant wall thickness between each portion's inner and outer surfaces. As such, outer surfaces 27, 43, 45 would be non-planar and form portions of the convoluted acoustical surfaces that correspond to and are formed concurrently with molding of the convoluted acoustical surfaces on the inner surfaces 40, 42, 44. In addition, it is further contemplated that air passage (i.e., holes, slits, slots, etc.) can extend through one or more of main body portion 26 and/or flange portions 32, 34 to assist in attenuating sound via air transfer through liner 16.

Figure 5:
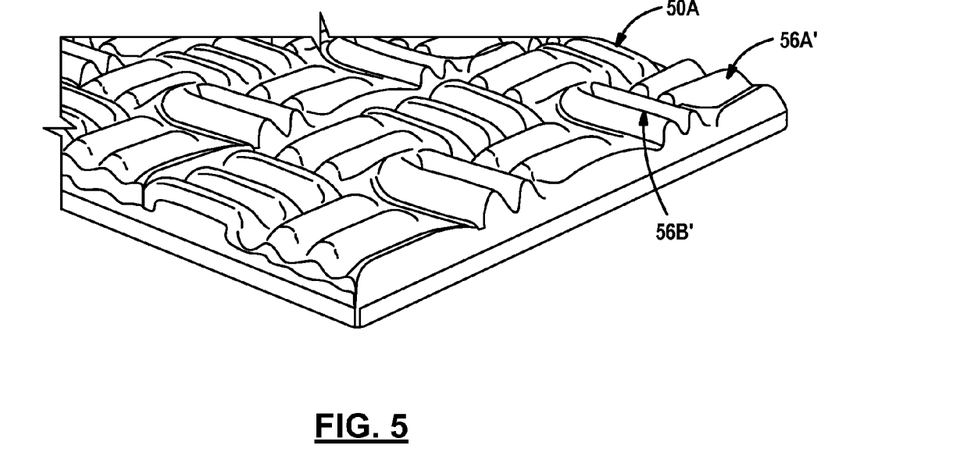
FIGS. 5 through 8 are examples of alternative convoluted surface profiles adapted for use with the acoustical sections of the wheel well liner and which are configured in accordance with alternative arrangements according to the present disclosure.
Figure 6:
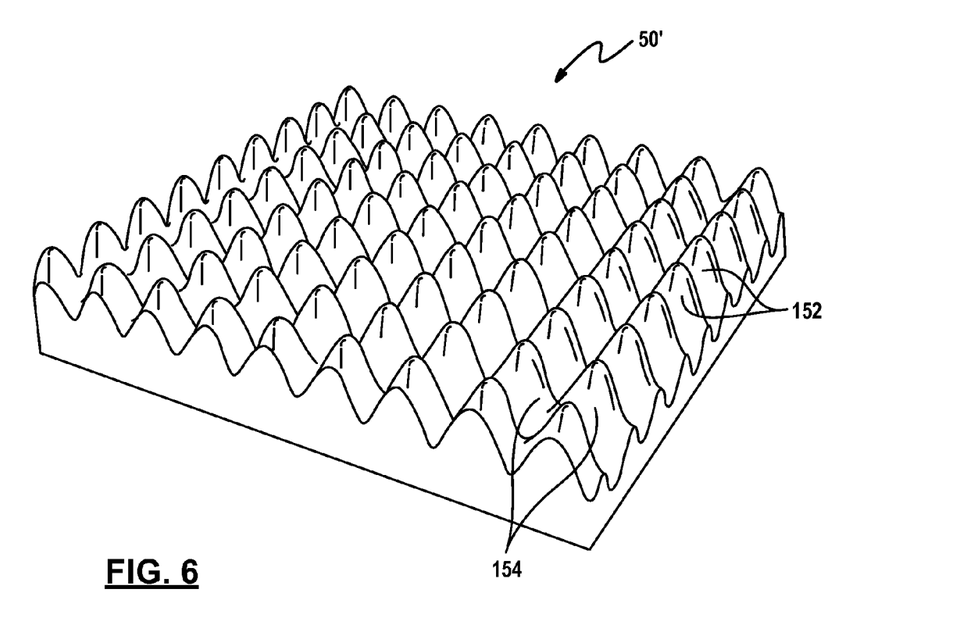
Figure 7:
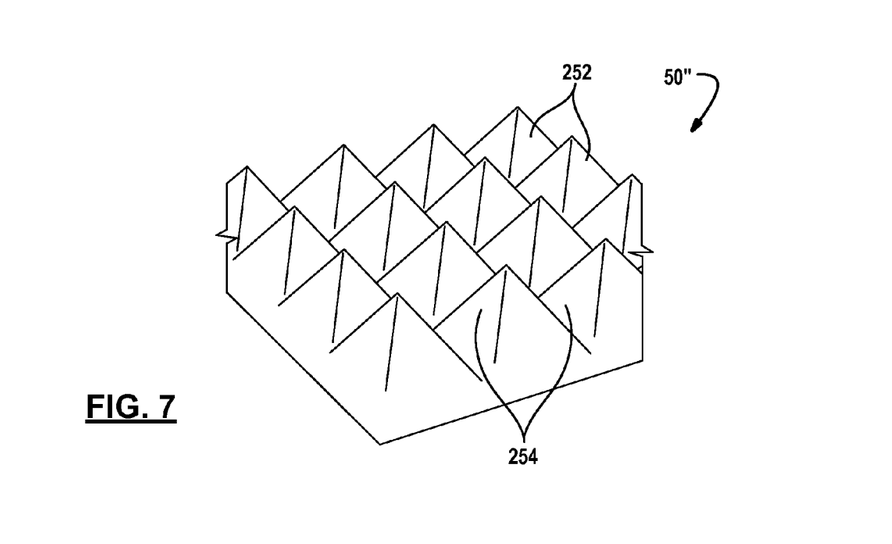
Figure 8:
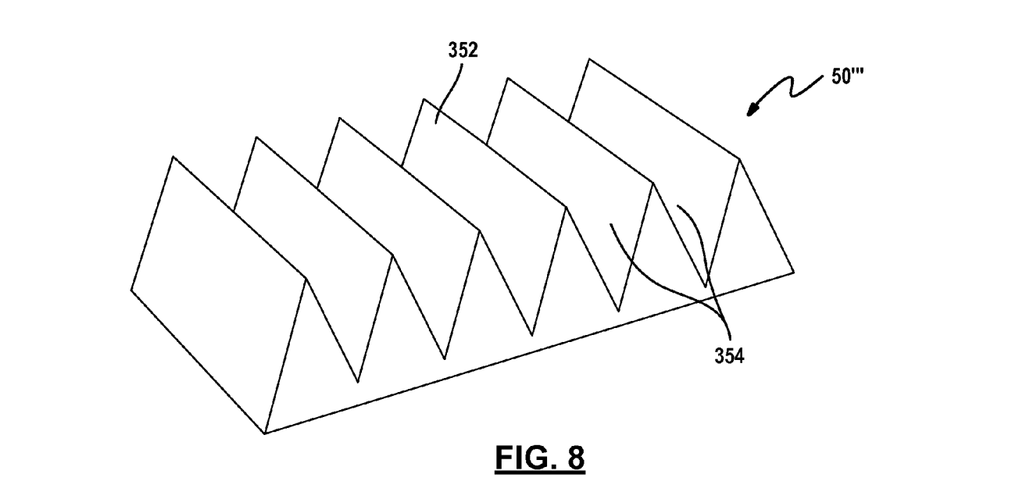

Referring to FIGS. 5-8, exemplary alternative configurations for the irregular convoluted portions of acoustical sections 50, 60, 70 of liner 16 are illustrated. FIG. 5 shows an acoustical section 50A having a continuous pattern of irregular surface portions 56A' and 56B'. FIG. 6 illustrates an acoustical section 50' comprised of aligned rows and columns of commonly shaped irregular portions 152 defining generally conical elements that are connected and separate by generally conical swales 154. FIG. 7 illustrates an acoustical section 50" comprised of aligned rows and columns of commonly shaped irregular portions 252 generally defining right pyramid elements that are connected and separated by generally inverse pyramid swales 254. Finally, FIG. 8 illustrates an acoustical section 50''' comprised of rows of elongated conical elements 352 that are interconnected by rows of elongated conical swales 354 to define the commonly shaped irregular portions. Thus, those skilled in the art will appreciate that any combination of irregular surfaces configured to provide sound absorption and/or noise attenuation in association with wheel well liner 16 can be used to provide acoustical sections that are formed into and extend from one or more of the inner surfaces of the liner.

Figure 9:
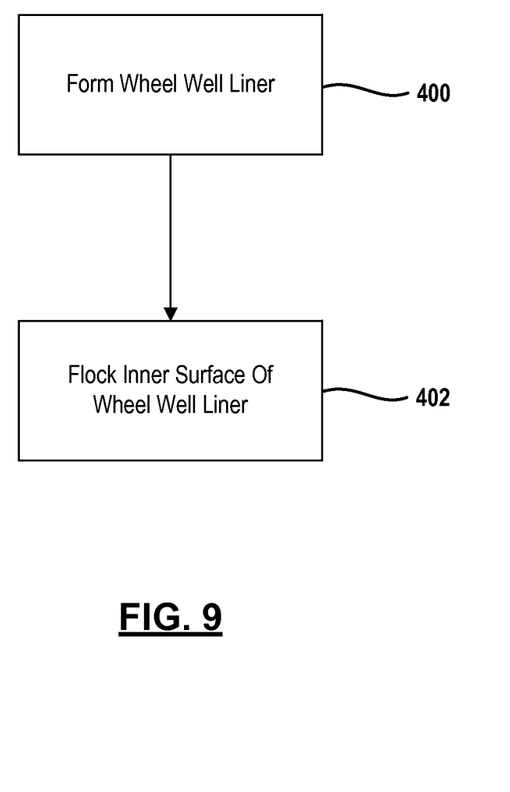
FIG. 9 is a block diagram of the steps associated with a method for flocking the inner surfaces of the wheel well liners.

Following fabrication of liner 16, the present disclosure further contemplates the application of small fibers via a "flocking" process to one or more of inner surfaces 40, 42 and 44. A method for this flocking operation is shown in the block diagram of FIG. 9 to include a first step 400 required to form liner 16 with its acoustical sections and a second step 402 required to flock the inner surface of liner 16. The flocking process generally includes a method of depositing many small fiber particles (i.e., "flock") onto the inner surface of liner 16. The fiber particles can be random cut or precision cut and having a length in the range of about 0.25 mm to two inches. The type of cut and length of the fibers will be selected to provide optimal sound attenuation and enhanced aesthetics. Likewise, the thickness of the flock particles can be selected from a range of about 1.5 to 28 denier to assist in optimized performance.

Flocking of the inner surface of liner 16 provides several features including supplemental sound attenuation, insulation and low reflectivity as well as enhanced aesthetics and appearance. The fiber particles can have length and thickness dimensions selected for use with liner 16 to withstand to environment to which the inner surfaces of liner 16 are exposed when installed on vehicle 10. The inner surfaces of liner 16 are initially coated with an adhesive and then the fibers are applied thereto, typically via application of a on electric field. Preferably, the flock is finely cut synthetic monofilament fibers such as, for example, nylon, raylon or polyester. The electric field causes the fibers to be electrically charged such that the fibers are propelled and anchored at generally right angles to the adhesive layer. However, other known processes for applying flock to the inner surfaces of liner 16 can also be utilized such as, for example, electrostatic, vibration and spraying techniques.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a wheel housing and a fender panel defining a wheel well;
   a wheel disposed in the wheel well;
   a liner disposed in the wheel well and spaced from the wheel, the liner having a main body portion, an inner flange portion secured to the wheel housing and an outer flange portion secured to the fender panel, the liner having at least one acoustical section formed on an inner surface of at least one of the main body portion, the inner flange portion and the outer flange portion, and wherein the acoustical section includes a convoluted sound absorbing/attenuating surface having an irregular surface portion.

2. The vehicle of claim 1 wherein the liner is made from a polymeric material.

3. The vehicle of claim 1 wherein the inner surface of at least two of the main body portion and the inner and outer flange portions includes an inner surface portion having an acoustical section formed thereon.

4. The vehicle of claim 3 wherein the acoustical section is generally configured in a rectangular form that is bounded by lateral and longitudinal boundaries, and wherein the acoustical section defines a grid pattern a first and second irregular surface portions.

5. The vehicle of claim 1 wherein the inner surface of the liner is flocked by depositing small fibers thereon.

6. The vehicle of claim 5 wherein the acoustical section is flocked.

7. The vehicle of claim 1 wherein the main body portion of the liner has an inner surface formed to include a plurality of acoustical.

8. The vehicle of claim 7 wherein the inner flange portion of the liner has an inner surface formed to include at least one acoustical section.

9. The vehicle of claim 8 wherein the acoustical section associated with the inner flange portion has a different profile than said acoustical sections associated with the main body portion.

10. The vehicle of claim 1 wherein said at least one acoustical section including said irregular surface portion faces toward said wheel; and further including a plurality of fiber particles disposed on said irregular surface portion facing said wheel.

11. The vehicle of claim 1 wherein said acoustical sections are spaced from one another by a planar surface.

12. A wheel well liner adapted for installation in a wheel well of a motor vehicle, comprising:
    a main body portion terminating at first and second ends and defining a first inner surface;
    an inner flange portion extending from the main body portion and defining a second inner surface; and
    an outer flange portion extending from the main body portion and defining a third inner surface;
    wherein said first inner surface includes an acoustical section configured to include irregular sound attenuating surface portions.

13. The wheel well liner of claim 12, wherein said first inner surface includes a plurality of distinct acoustical sections.

14. The wheel well liner of claim 13 wherein each of the plurality of distinct acoustical sections is identical and includes a grid of first and second irregular surface portions.

15. The wheel well liner of claim 12 wherein said acoustical section includes a plurality of conical projections defining the irregular surface portions.

16. The wheel well liner of claim 12 further including a second acoustical section formed on said second inner surface.

17. The wheel well liner of claim 16 further including a third acoustical section formed on said third inner surface.

18. The wheel well liner of claim 16 wherein said first and second acoustical sections included differently configured irregular surface portions.

19. The wheel liner of claim 12 wherein said acoustical section including irregular sound attenuating surface portions faces toward a wheel; and further including a plurality of fiber particles disposed on said irregular sound attenuating surface portions facing the wheel.

20. A wheel well liner for installation in a wheel well of a motor vehicle, comprising:
 a main body portion presenting an inner surface for facing a wheel;
 said inner surface including at least one acoustical section for attenuating sound, each of said acoustical sections presenting a non-planar profile; and
 a plurality of fiber particles disposed on said non-planar profile of said inner surface.

21. The wheel well liner of claim 20 wherein at least some of said fiber particles are disposed at a right angle to said inner surface.

22. The wheel well liner of claim 20 including a layer of adhesive attaching said fiber particles to said inner surface.

23. The wheel well liner of claim 22 wherein said fiber particles are applied to said adhesive layer by electrically charging said fiber particles and propelling said electrically charged fiber particles onto said adhesive layer.

24. The wheel well liner of claim 20 wherein fiber particles are applied by electrostatic, vibration, or spraying techniques.

25. The wheel well liner of claim 20 including a plurality of said acoustical sections spaced from one another by a planar portion of said inner surface.

26. The wheel well liner of claim 25 wherein said plurality of acoustical sections and said planar portions of said inner surface form a grid.

27. The wheel well liner of claim 20 including a layer of adhesive attaching said fiber particles to said non-planar profile of said inner surface; and
 wherein said main body portion includes a plurality of holes for allowing air flow;
 each of said acoustical sections are spaced from an adjacent acoustical section by a planar portion of said inner surface such that said plurality of acoustical sections and said planar portions of said inner surface form a grid;
 said non-planar profile of said inner surface includes a repetitive sequence of at least one pattern; and
 said fiber particles have a length of 0.25 mm to 2 inches, and at least some of said fiber particles are disposed at a right angle to said layer of adhesive.

* * * * *